United States Patent
Matsui

[11] Patent Number: 5,663,840
[45] Date of Patent: Sep. 2, 1997

[54] OBJECTIVE LENS ACTUATOR FOR OPTICAL HEAD AND USED FOR HIGH SPEED ACCESS

[75] Inventor: Tsutomu Matsui, Tokyo, Japan

[73] Assignee: NEC Corporation, Japan

[21] Appl. No.: 473,306

[22] Filed: Jun. 7, 1995

[30] Foreign Application Priority Data

Jun. 14, 1994 [JP] Japan ................................. 6-131516
Mar. 30, 1995 [JP] Japan ................................. 7-073092

[51] Int. Cl.[6] .................................................. G11B 7/095
[52] U.S. Cl. ........................ 359/814; 359/824; 369/44.15
[58] Field of Search .............................. 369/44.14–44.16; 359/813–814, 823–824

[56] References Cited

U.S. PATENT DOCUMENTS

| | | |
|---|---|---|
| 4,641,296 | 2/1987 | Mizunoe et al. |
| 4,861,138 | 8/1989 | Suzuki . |
| 5,078,471 | 1/1992 | Takishima . |
| 5,208,703 | 5/1993 | Ikegame et al. |

FOREIGN PATENT DOCUMENTS

0287285  10/1988  European Pat. Off. .

OTHER PUBLICATIONS

"Push–Pull Tracking Error Detection Using a Pickup With Polarizing Hologram", K. Kasazumi, et al., Extended Abstracts of Autumn Meeting of Jpn. Soc. Appl. Phys., Sep. 1994.

Patent Abstracts of Japan, vol. 17, No. 194, (P–1522), Apr. 15, 1993, & JP 4–341939.

*Primary Examiner*—W. R. Young
*Attorney, Agent, or Firm*—Ostrolenk, Faber, Gerb & Soffen, LLP

[57] ABSTRACT

An objective lens actuator for an optical head includes an objective lens, an objective lens holder, a focusing coil, a pair of tracking coils, a plurality of wire springs, a magnetic circuit, and a pair of photosensors. The objective lens is constituted by an aspherical plastic lens to receive a beam reflected by an optical disk. The objective lens holder has a substantially square frame shape to hold the objective lens. The focusing coil is wound on the objective lens holder. The pair of tracking coils are arranged on parallel side surfaces of the objective lens holder, respectively. The plurality of wire springs hold the objective lens holder with a degree of freedom in focusing and tracking directions. The magnetic circuit has a substantially closed magnetic circuit arrangement to cooperate with the focusing and tracking coils to electromagnetically drive the objective lens holder. The pair of photosensors is arranged below an edge portion of the objective lens to receive, through the edge portion of the objective lens, a diffracted reflected beam which generates a tracking error signal and is obtained such that a beam emitted from a main portion of the objective lens is diffracted and reflected by a pre-groove optical disk.

5 Claims, 10 Drawing Sheets

OBJECTIVE LENS ACTUATOR FOR OPTICAL HEAD AND USED FOR HIGH SPEED ACCESS

BACKGROUND OF THE INVENTION

The present invention relates to an objective lens actuator for an optical head which is arranged in an optical disk apparatus and only reproduces data or can record/reproduce/erase data and, more particularly, to an objective lens actuator, for an optical head, which can cope with high-speed access and uses a lens having a large numerical aperture.

In recent years, studies of an optical disk apparatus which copes with a high-definition system or is designed to digitize a current broadcast system or an external storage apparatus having the high accessibility of a magnetic disk for a computer and the large-capacity storage capability of an optical disk have rapidly advanced. As a next-generation disk apparatus, an apparatus in which the numerical aperture of the objective lens of an optical head, of an optical disk apparatus, capable of recording/reproducing/erasing data, is large, and a laser having a shorter wavelength is used, has been considered to obtain a high transfer rate and large-capacity storage capability. In particular, since the numerical aperture increases and the laser wavelength decreases in a focusing servo operation, a focal depth decreases. For this reason, an objective lens actuator having a high resolution and a high precision has been desired.

In a magneto-optical head which copes with high-speed access, an arrangement of a 1-beam scheme is shown in FIG. 12. A divergent beam emitted from a laser 61 is converted into a parallel beam by a collimator lens 62, and the parallel beam propagates straight through beam splitters 63 and 64 to be incident on an optical path system having different optical lengths corresponding to the inner and outer peripheries of an optical disk. An objective lens actuator 66 having a 45° mirror 65 is arranged at the distal end of the optical path system, and an objective lens is tracked in accordance with the surface vibration or decentering of the optical disk. This tracking operation is performed by signals obtained in focusing error detection (to be described later) and tracking error detection (to be described later) on the basis of a beam polarized by the beam splitter 63.

In this optical system, when an optical disk 67 is radially inclined during rotation, the beam passes through an optical path indicated by broken line in FIG. 12. A beam reflected by the optical disk 67 reversely passes through the above optical path, and the beam propagates along an axis deviating from the optical axis of an original optical design, as indicated by the broken line. The beam is polarized by the beam splitter 63, and is incident on a two-division sensor 68 (to be described later) to be offset from the central axis of the two-division sensor 68, thereby detecting a tracking error signal having an offset.

FIGS. 13 and 14A to 14C show the optical system having the offset in detail. A beam emitted from a laser 71 is converted into a parallel beam, and the parallel beam is polarized by a beam splitter 72 by 90° and reaches an optical disk 74 through an objective lens 73. The return beam propagates straight through the objective lens 73 and the beam splitter 72 to reach a two-division sensor 75. At this time, a differential output of the outputs from the two-division sensor 75 is detected as a tracking error signal by a differential amplifier 76. In this optical system, when tracking error detection is performed while the light beam is offset from the central axis of the two-division sensor 75, the state of the tracking error signal is changed into a tracking error signal having no offset (as shown in FIG. 14A) and into tracking error signals each having an offset (as shown in FIGS. 14B and 14C). Such a tracking error signal having an offset results in an unstable tracking operation.

In the above magneto-optical head, since the length of the optical path between the disk and the position at which tracking error detection is performed must be large, a tracking error offset is impossible. In addition, in order to constitute a polarization optical system for perform magneto-optical detection, the transmittance and reflectance of P and S waves serving as waves polarized by the beam splitter must be controlled. For this reason, an optical arrangement is disadvantageously complex.

In particular, in a magneto-optical head arrangement, a polarization plane must be controlled. For this reason, a head in which the optical arrangement shown in FIG. 12 is directly arranged below an objective lens actuator is considered. However, the polarizing conditions of the beam splitter also used as a 90° rising mirror must be satisfied. More specifically, the transmission efficiency of a P-polarized beam and the reflection efficiency of an S-polarized beam must be optimized. When an S-polarized beam is incident on the beam splitter, it is important to increase the reflection efficiency of the P-polarized beam serving as a magneto-optical signal. In addition, a beam splitter in which the S-polarized beam for detecting a tracking error signal has high transmission efficiency cannot be easily designed.

A conventional objective lens actuator for an optical head must be decreased in size to cope with the trend of a decrease in weight, thickness, length, and size and low cost, the size of the actuator must be small. However, hole portions in which a yoke is inserted must be formed to form a magnetic return path for a closed magnetic path. In addition, the thicknesses of the portions around the yoke insertion hole portions of a lens holder, and focusing and tracking coils which receive a driving force for an electromagnetic drive operation must be large, and the actuator must have mechanical rigidity to prevent generation of a secondary resonance frequency which is undesirable in a servo operation. Therefore, the size of the actuator is disadvantageously increased.

Since a large-size actuator has a heavy weight, a tracking drive sensitivity decreases, and the productivity cannot be easily improved.

In addition, when an open magnetic circuit arrangement is used in place of a closed magnetic circuit arrangement, magnetic utilization efficiency is considerably degraded.

SUMMARY OF THE INVENTION

It is an object of the present invention to provide an objective lens actuator, for an optical head, which reduces an offset in tracking error detection of an optical head which copes with high-speed access.

It is another object of the present invention to provide an objective lens actuator, for an optical head, which satisfies the optical conditions of a polarizing system for detecting a magneto-optical signal.

It is still another object of the present invention to provide a compact objective lens actuator for an optical head.

It is still another object of the present invention to provide an objective lens actuator, for an optical head, which improves a tracking drive sensitivity and productivity.

In order to achieve the above objects, according to the present invention, there is provided an objective lens actuator for an optical head, comprising an objective lens, constituted by an aspherical plastic lens, on which a beam reflected by an optical disk is incident, an objective lens holder, having a substantially square frame shape, for holding the objective lens, a focusing coil wound on the objective lens holder, a pair of tracking coils arranged on parallel side surfaces of the objective lens holder, respectively, a plurality of wire springs for holding the objective lens holder with a degree of freedom in focusing and tracking directions, a magnetic circuit, having a substantially closed magnetic circuit arrangement, for cooperating with the focusing and tracking coils to electromagnetically drive the objective lens holder, and a pair of photosensors, arranged below an edge portion of the objective lens, for receiving, through the edge portion of the objective lens, a diffracted reflected beam which generates a tracking error signal and is obtained such that a beam emerging from a main portion of the objective lens is diffracted and reflected by a pre-groove optical disk.

DESCRIPTION OF THE PREFERRED EMBODIMENTS

Figure 1:
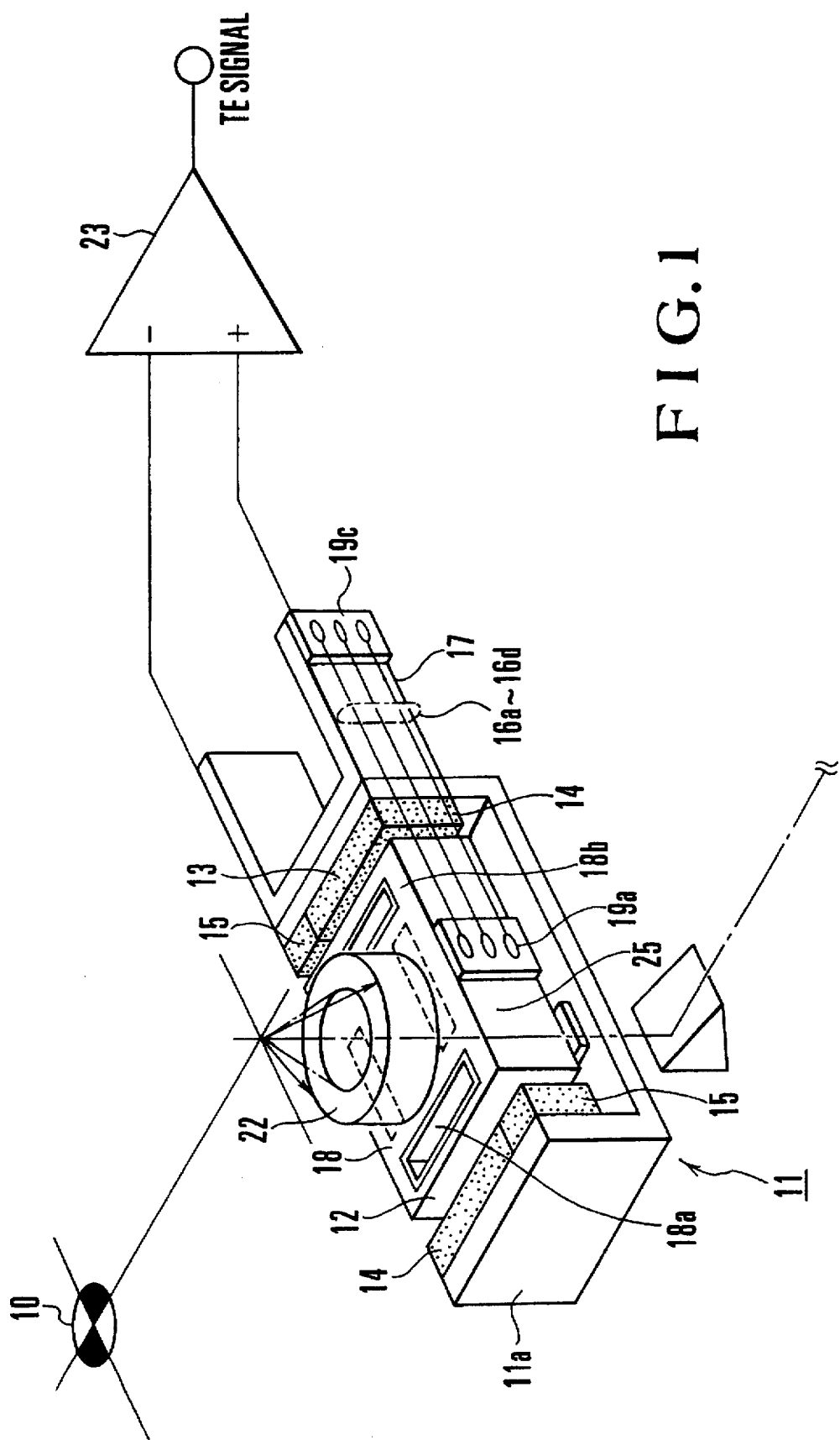
FIG. 1 is a perspective view showing an objective lens actuator according to an embodiment of the present invention.
Figure 5:
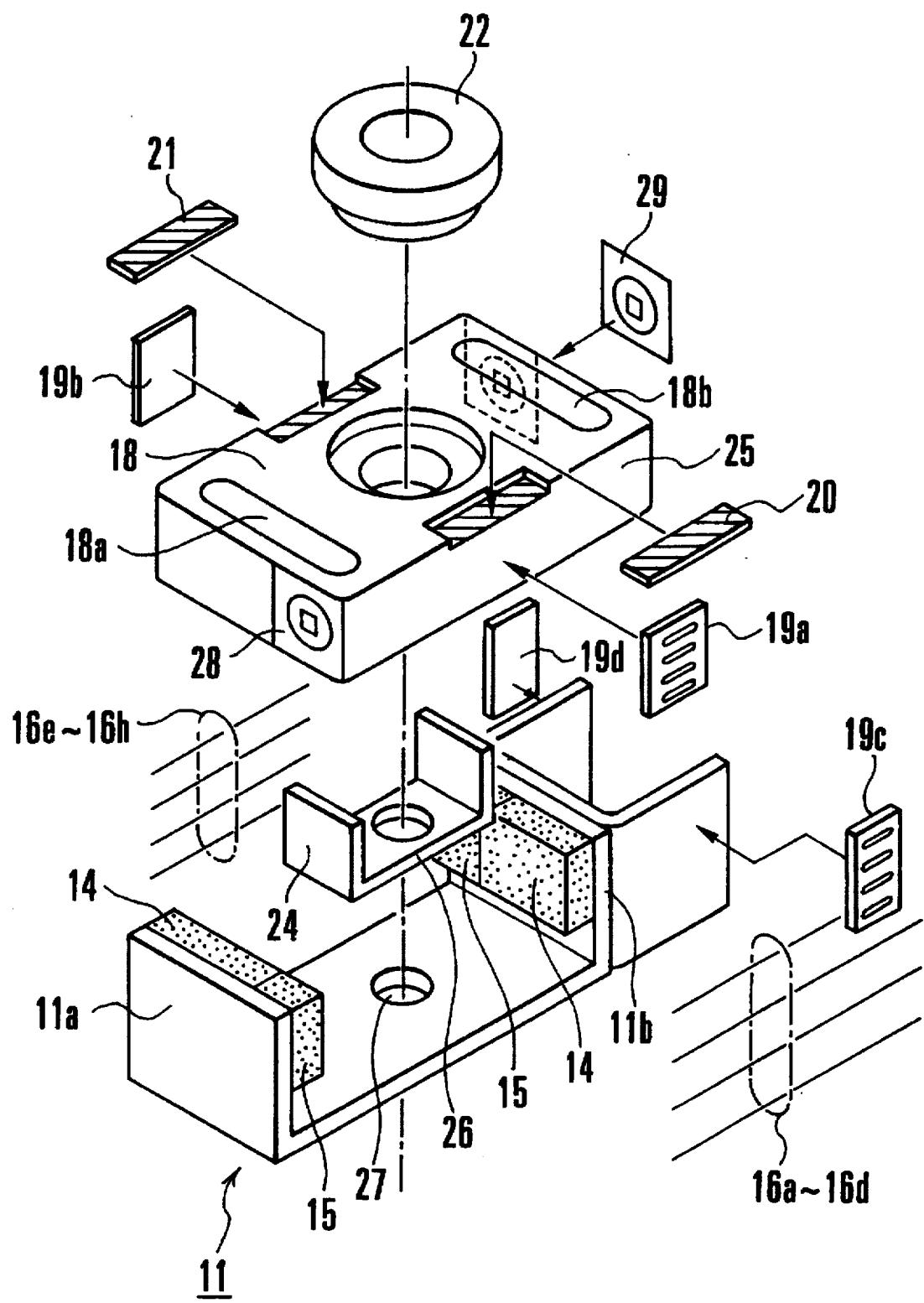
FIG. 5 is an exploded perspective view of the objective lens actuator shown in FIG. 1.

Embodiments of the present invention will be described below with reference to the accompanying drawings. FIGS. 1 and 5 show an objective lens actuator according to the present invention. Referring to FIGS. 1 and 5, an elongated actuator base 11 consisting of a magnetic material and having bent portions 11a and 11b formed at both the ends of the actuator base 11 constitutes a magnetic circuit. A hole 27 constituting a circular slit which passes a collimated beam is formed in the central portion of the actuator base 11, two pairs of magnets each constituted by long and short magnets 14 and 15 are respectively arranged on the bent portions 11a and 11b in the tracking direction of an optical disk 10 such that the two pairs of magnets oppose each other and have opposite polarities. The long and short magnets 14 and 15 form magnetic gaps 12 and 13 between the long and short magnets 14 and 15 and a yoke (to be described later) in a direction (tangential direction of the optical disk 10) perpendicular to the tracking direction of the optical disk 10.

A U-shaped stand portion 17 constituting parallel leaf springs, consisting of a conductive material, and having eight wire springs 16a to 16d and 16e to 16h attached to both the sides of the stand portion 17 is arranged at one end of the actuator base. A pair of printed boards 19c and 19d are adhered to the distal ends of the stand portion 17. One end of each of the four wire springs 16a to 16d vertically arranged at equal intervals parallel to the longitudinal direction of the actuator base 11 and one end of each of the four wire springs 16e to 16h vertically arranged at equal intervals parallel to the longitudinal direction of the actuator base 11 are connected to the pair of printed boards 19c and 19d, respectively. The other end of each of the wire springs 16a to 16d and 16e to 16h is attached, through a corresponding one of a pair of printed boards 19a and 19b, to a corresponding one of the side portions of a square-frame lens holder 18 having an objective lens 22 constituted by an aspherical plastic lens arranged between the pair of bent portions 11a and 11b of the actuator base 11. The printed boards 19a and 19b are adhered to the lens holder 18 on which a focusing coil 25 is wound. The two ends of the wire springs 16a to 16d and the wire springs 16e to 16h are joined to the printed boards 19c and 19d of the stand portion 17 and the printed boards 19a and 19b of the lens holder 18 by a cream solder and optical beam heating with a halogen lamp or the like.

The focusing coil 25 for performing a focusing operation and a tracking drive operation is wound on the lens holder 18 with a degree of freedom in the focusing and tracking directions and held by the wire springs 16a to 16d and 16e to 16h. Tracking coils 28 and 29 are adhered to both the sides, of the lens holder 18, opposing the magnetic gaps 12 and 13, such that the tracking coils 28 and 29 are arranged at diagonal positions. The tracking coils 28 and 29 are arranged on the lens holder 18 across the boundaries between the long and short magnets 14 and 15. Two rectangular hole portions 18a and 18b are formed in both the end portions of the lens holder 18, and a U-shaped yoke 24 is inserted into the hole portions 18a and 18b with an interval. A hole 26 is formed in the yoke 24 in correspondence with a hole 27 of the actuator base 11. The long and short magnets 14 and 15 fixed to the bent portions 11a and 11b of the actuator base 11 are arranged with opposite polarities at positions symmetric with respect to the hole 27 which passes a collimated beam.

Photosensors 20 and 21 for detecting a tracking error (TE) signal of the objective lens are attached to the upper portions of the lens holder 18. Electrical connection to the photosensors 20 and 21 is performed through the printed boards 19a and 19b, the wire springs 16a to 16d, and the wire springs 16e to 16h. The objective lens 22 is adhered to the lens holder 18 to cover the flat portions of the flange portions of the photosensors 20 and 21. When the frame of the lens holder 18 is fitted in the magnetic gaps 12 and 13 of the actuator base 11, an electromagnetic drive type actuator is constituted. A tracking error signal from a beam reflected by the optical disk 10 can be detected by the differential amplifier 23 using beams received by the photosensors 20 and 21 through the objective lens 22.

Figure 2:
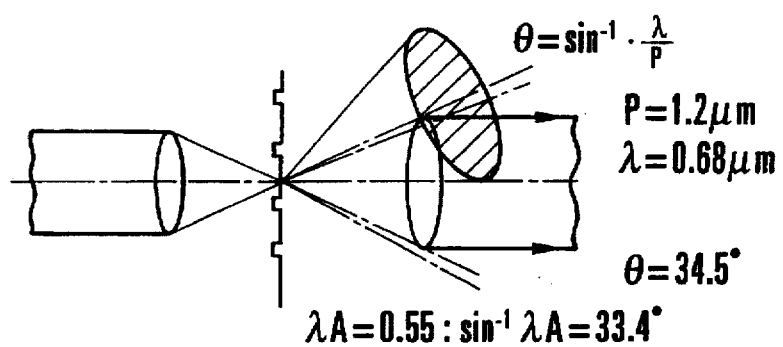
FIG. 2 is a view for explaining the principle of tracking error signal detection.

FIG. 2 shows a style in which a beam incident on the objective lens actuator and a beam diffracted and reflected by a pre-groove optical disk are returned and then transmitted. A dispersion angle θ of ±1st-order diffracted components is given by equation (1):

$$\theta = \sin^{-1}(\lambda/P) \qquad (1)$$

where:

λ; wavelength,

P; pitch width of optical disk

For example, if λ=0.68 μm and P=1.2 μm, then λ=34.5° is obtained. If the numerical aperture (NA) of the objective lens 22=0.55, then a half-angle =33.4°. As a result, as shown in FIG. 2, ½ or more of the light amount of the reflected beam is truncated. In this manner, the diffracted beam axis crosses the edge portion of the aspherical plastic lens 22. For this reason, when the photosensors 20 and 21 are arranged on the edge portions, ±1st-order diffracted components serving as the source of a tracking error signal can be detected.

Figure 3:
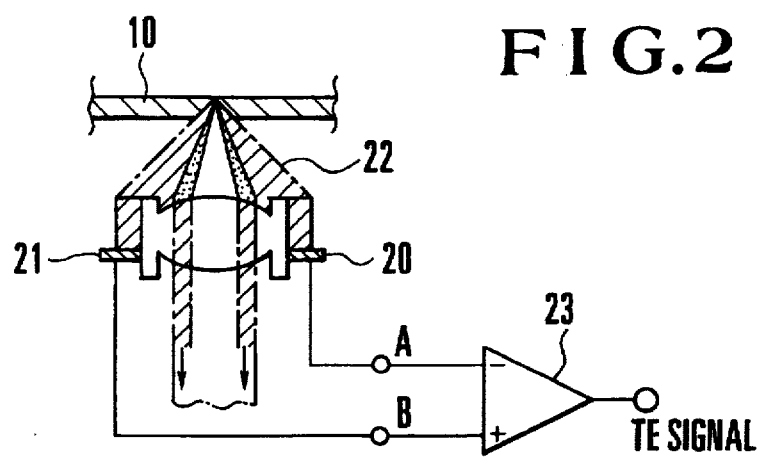
FIG. 3 is a view for explaining tracking error signal detection performed by an aspherical plastic lens shown in FIG. 1.

FIG. 3 shows a beam incident on the aspherical plastic lens 22 and a beam reflected by the optical disk 10. Referring to FIG. 3, ±1st-order diffracted components are received by the photosensors 20 and 21 arranged below the objective lens 22, and a tracking error signal is obtained by the differential amplifier 23. The reflected beam is indicated by hatched portions in FIG. 3.

Figure 4:
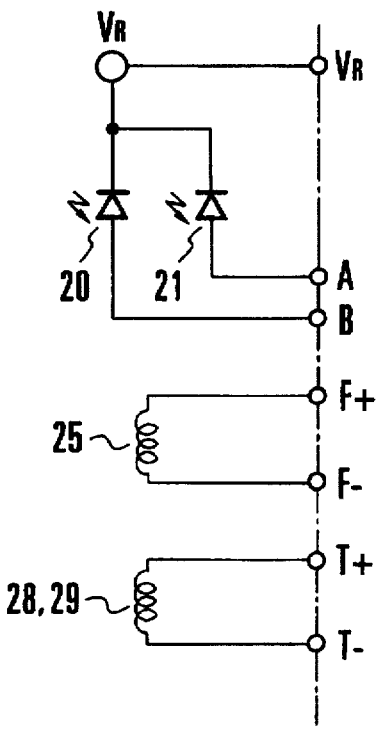
FIG. 4 is a wiring diagram of wire springs of an objective lens holder shown in FIG. 1.

FIG. 4 shows a wiring arrangement of the wire springs 16a to 16d and the wire springs 16e to 16h on the lens holder 18 side. The lens holder 18 comprises seven terminals, i.e., power supply terminals F+ and F− of the focusing coil 25, power supply terminals T+ and T− of the tracking coils 28 and 29, a reverse bias terminal VR and detection terminals A and B of the PIN photosensors 20 and 21. For this reason, at least seven wire springs are required for the lens holder 18, and one dummy wire spring is added to keep the balance of the lens holder 18. Therefore, the lens holder 18 is supported by four wire springs on each side, i.e., a total of 8 wire springs.

Figure 6A:
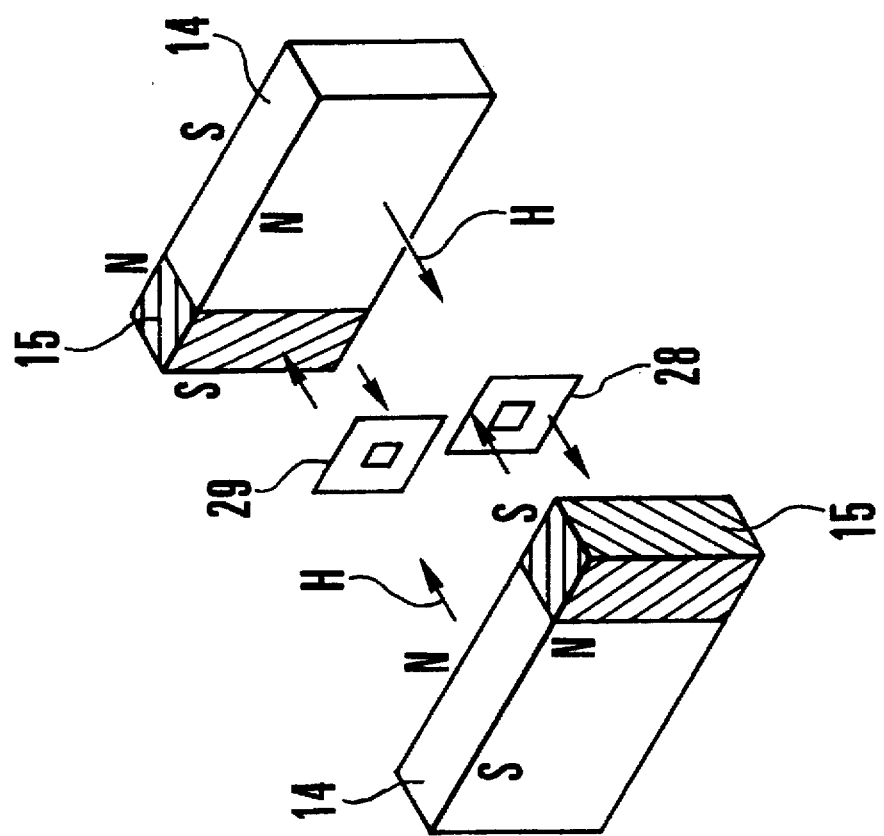
FIGS. 6A and 6B are views for explaining a tracking operation of the objective lens actuator shown in FIG. 1.
Figure 6B:
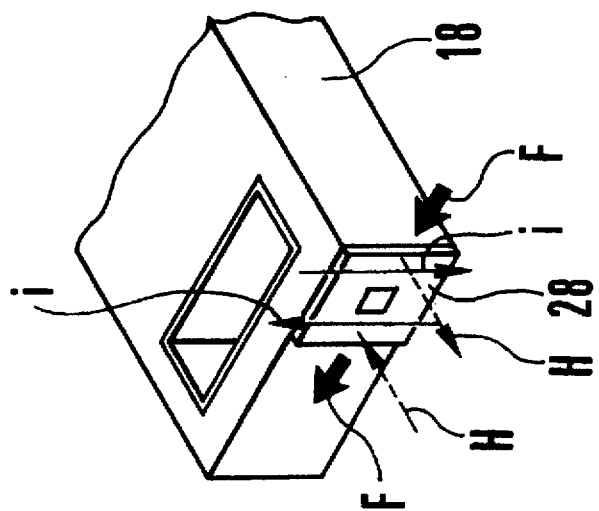

With the above arrangement, the focusing coil 25 and the tracking coils 28 and 29 are selectively driven on the basis of focusing and tracking error signals to cause the lens holder 18 to perform a tracking operation in two axial directions perpendicular to each other. More specifically, as shown in FIGS. 6A and 6B, when currents i in the directions shown in FIG. 6B flow in the tracking coil 28, a magnetomotive force F in the same direction can be obtained on the opposite sides of the tracking coil 28 because magnetic fields H having different directions are generated on the opposing sides of the tracking coil 28 in the tracking direction. A magnetomotive force having the same direction as that of the magnetomotive force of the tracking coil 28 is generated by the tracking coil 29.

In this case, tracking error detection is performed by the photosensors 20 and 21 arranged immediately below the edge portion of the aspherical objective lens 22, as shown in FIG. 3. In a conventional optical head, the distance between an optical disk and a two-division sensor for detecting a tracking error must be as long as an optical length to the inner periphery of a separate type optical head which can access the inner and outer peripheries. According to the present invention, an optical path length is reduced from that of such a conventional optical head by about ⅕₀, a problem caused by an offset can be solved. In addition, in a polarization optical system such as a magneto-optical system, preferable characteristics can be obtained.

In this embodiment, the magnets 14 and 15 are driven, in correspondence with the tracking coils 28 and 29, in the magnetic gaps 12 and 13 each having a magnetic flux stabilized by the arrangement of the yoke 24. More specifically, as shown in FIGS. 6A and 6B, a drive sensitivity twice that of a conventional optical head can be achieved by arranging opposite magnetic polarities with respect to currents having opposite directions on the opposite sides of the tracking coils 28 and 29. In a focusing drive operation, each short magnet 15 operates to reduce a thrust. However, in optical disk servo system in which high-speed random access is principally performed, a still operation is established as standards, and a highly sensitive optical head which can cope with high-speed random access by a small current is required. For this purpose, as described above, the optical head which has some trouble at a focusing drive sensitivity but can achieve a tracking drive sensitivity twice that of a conventional optical head is advantageous.

According to the present invention, as described above, the aspherical plastic lens is arranged on the movable lens holder, and a pair of separated photosensors are arranged immediately below the plastic lens. An aspherical plastic lens generally has a fringe at the edge portion of the aspherical plastic lens, and a diffracted beam for detecting a tracking error is detected by using the flat portion of the fringe. For this reason, tracking error signal detection in an optical disk apparatus Which copes with high-speed access can be advantageously performed in a state in which a tracking offset is small. In addition, unlike an electromagnetic head, the optical head can be constituted at low cost without using a beam splitter, a prism mirror, or the like which-is arranged in consideration of a polarizing system.

Another embodiment of the present invention will be described below with reference to the accompanying drawings.

Figure 7A:
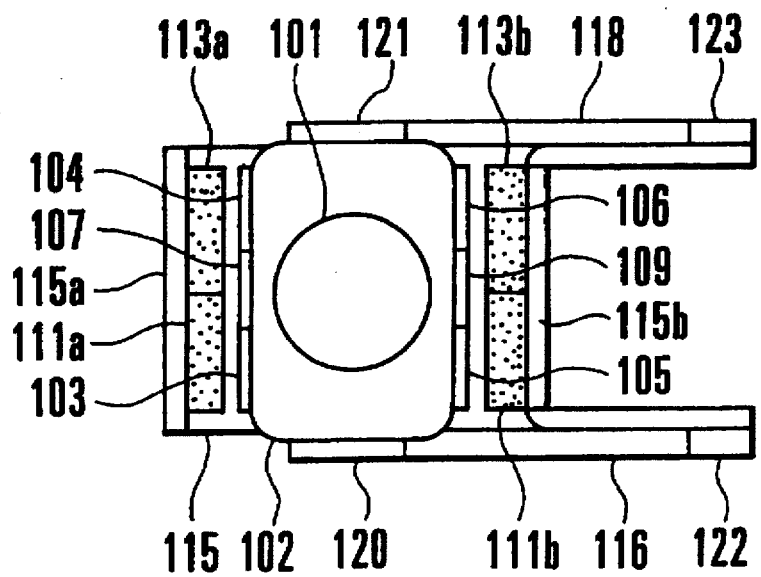
FIGS. 7A and 7B are plan and side views showing an objective lens actuator according to another embodiment of the present invention.
Figure 7B:
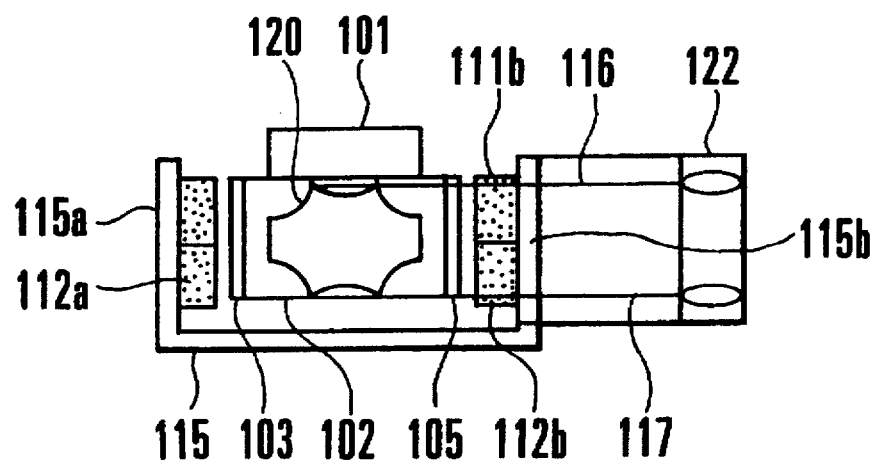
Figure 8:
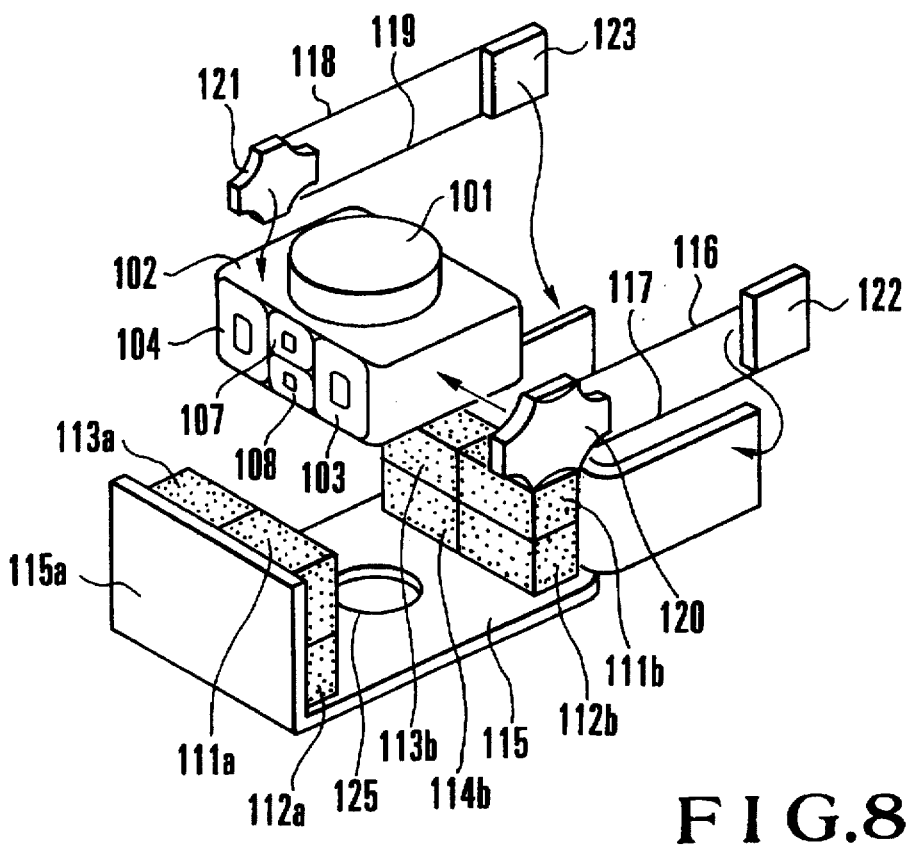
FIG. 8 is an exploded perspective view of the objective lens actuator shown in FIGS. 7A and 7B.
Figure 9:
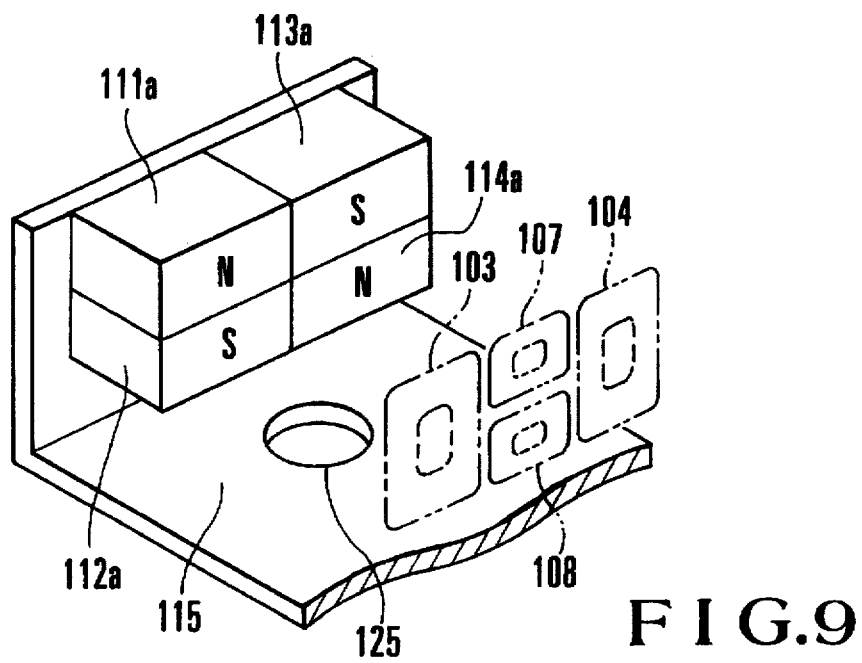
FIG. 9 is a view for explaining the magnetic circuits and coil portion of the objective lens actuator shown in FIGS. 7A and 7B.

FIGS. 7A, 7B, and 8 show an objective lens actuator for an optical head according to the second embodiment of the present invention. FIG. 9 explains a magnetic circuit and part of a coil portion in the objective lens actuator shown in FIGS. 7A and 7B.

The objective lens actuator for an optical head shown in FIGS. 7A and 7B comprises an objective lens 101, a square lens holder 102 for holding the objective lens 101, four focusing coils 103 to 106 arranged on side surfaces of the lens holder 102, a total of four tracking coils (i.e., two tracking coils 107 and 109 arranged on the side surfaces of the lens holder 102, one tracking coil 108 (FIG. 8) arranged below the tracking coil 107, and one tracking coil (not shown) arranged below the tracking coil 109), a total of eight magnets (i.e., six magnets 111a, 112a, 113a, 111b, 112b, and 113b arranged such that the magnets 111a, 112a, and 113a respectively oppose the magnets 111b, 112b, and 113b , and two magnets 114a (FIG. 9) and 114b (FIG. 8) respectively arranged below the magnets 113a and 113b), an actuator base 115 having bent portions 115a and 115b, formed at both the ends of the actuator base 115, on which the eight magnets are arranged, four wires 116 to 119 for flowing a current applied to the focusing and tracking coils, and printed boards 120 to 123 for supporting the four wires 116 to 119 and relaying the current.

The pair of focusing coils 103 and 104 are arranged on the left and right sides of one wide side surface of the four side surfaces of the square lens holder 102 for holding the objective lens 101, and the pair of tracking coils 107 and 108 are vertically arranged between the focusing coils 103 and 104. Like the focusing coils 103 and 104, the pair of focusing coils 105 and 106 are arranged on the side surface opposing the side surface on which the focusing coils 103 and 104 are arranged. Like the tracking coils 107 and 108, the pair of tracking coils (only the tracking coil 109 is shown in FIG. 7A) are arranged between the pair of focusing coils 105 and 106.

In the actuator base 115, a beam passage hole 125 serving as a path for a beam passing through the objective lens 101 is formed. Although the eight magnets constituting a magnetic circuit are arranged, of these magnets, the magnets 111a, 112a, 113a, 111b, 112b, 113b, and 114b are shown in FIG. 8, the magnet 114a arranged below the magnet 113a is shown in FIG. 9.

One end of each of the wires 116 and 117 is soldered on the printed board 122, and the other end is soldered on the printed board 120. One end of each of the wires 118 and 119 is soldered on the printed board 123, and the other end is soldered on the printed board 121. In addition, the printed boards 120 and 121 are adhered to the side surfaces of the lens holder 102, and the printed boards 122 and 123 are adhered to the side surfaces of the actuator base 115. In this state, the lens holder 102 is supported by four wires with respect to the actuator base 115.

The detailed structure of the above actuator and the operations of the respective parts of the actuator will be described below.

Referring to FIGS. 7A, 7B, and 8, the focusing coils 103 and 104 serving as a pair of large square flat coils and the tracking coils 107 and 108 serving as a pair of small square flat coils are incorporated on one side surface of the wide side surfaces of the square lens holder 102. On the side surface opposing the above side surface, the focusing coils 105 and 106 serving as a pair of large square flat coils and the tracking coil 109 and one tracking coil (not shown) which serve as a pair of small square flat coils are incorporated. The two printed board 120 and 121 are adhered to the two narrow side surfaces of the lens holder 102, and an objective lens is incorporated in the upper portion of the lens holder 102. The four wires 116, 117, 118, and 119 mechanically support the lens holder 102 and relay a focusing drive current and a tracking drive current, which are supplied to the printed boards 122 and 123, to the four focusing coils and the four tracking coils through the printed boards 120 and 121. The four wires constitute two pairs, and the two pairs of wires are used to supply the focusing drive current and the tracking drive current to the coils. The four focusing coils are connected parallel to each other or are connected in series with each other, and the four focusing coils are connected to the two wires for supplying the focusing drive current. In addition, the four tracking coils are also connected parallel to each other or are connected in series with each other, and the four tracking coils are connected to the two wires for supplying the tracking drive current.

Although the lens holder 102 is driven by an electromagnetic force generated by the applied focusing drive current, the applied tracking drive current, and a magnetic field from a magnetic circuit having an open magnetic circuit arrangement, the correspondence between the focusing coils, the tracking coils, and the magnets and a driving force generated by a drive current and a magnetic field will be described below.

Referring to FIG. 9, the focusing coils 103 and 104 and the tracking coils incorporated on one side surface of the square lens holder 102 and the four magnets 111a to 114a arranged on the actuator base 115 are shown.

The magnet 111a is arranged on the bent portion 115a of the actuator base 115 in correspondence with the focusing coil 103 and the tracking coil 107 such that the magnetic flux of the magnet 111a passes through the upper half portion of the focusing coil 103 and a half portion (near the focusing coil 103) of the tracking coil 107. The magnet 111a is arranged on the actuator base 115 such that the N pole of the magnet 111a opposes the focusing coil 103. The magnet 112a is arranged on the bent portion 115a of the actuator base 115 in correspondence with the focusing coil 103 and the tracking coil 108 such that the magnetic flux of the magnet 112a passes through the lower half portion of the focusing coil 103 and a half portion (near the focusing coil 103) of the tracking coil 108. The magnet 112a is arranged on the actuator base 115 such that the S pole of the magnet 112a opposes the focusing coil 103. The magnet 113a is arranged on the bent portion 115a of the actuator base 115 in correspondence with the focusing coil 104 and the tracking coil 107 such that the magnetic flux of the magnet 113a passes through the upper half portion of the focusing coil 104 and a half portion (near the focusing coil 104) of the tracking coil 107. The magnet 113a is arranged on the actuator base 115 such that the S pole of the magnet 113a opposes the focusing coil 104. The magnet 114a is arranged on the bent portion 115a of the actuator base 115 in correspondence with the focusing coil 104 and the tracking coil 108 such that the magnetic flux of the magnet 114a passes through the lower half portion of the focusing coil 104 and a half portion (near the focusing coil 104) of the tracking coil 108. The magnet 114a is arranged on the actuator base 115 such that the N pole of the magnet 114a opposes the focusing coil 104.

Although not shown in FIG. 9, a pair of focusing coils and a pair of tracking coils are arranged on the side surface opposing the side surface on which the focusing coils 103 and 104 and the tracking coils 107 and 108 are incorporated. Although four magnets 111b to 114b are arranged on the actuator base 115 to oppose the four coils, the correspondence between the relative positions of the four coils and the four magnets 111b to 114b is the same as that of the focusing coils 103 and 104 and the tracking coils 107 and 108 and the four magnets 111a to 114a. The magnets 111b to 114b are arranged on the bent portion 115b, of the U-shaped actuator 115, opposing the bent portion 115a.

Figure 10:
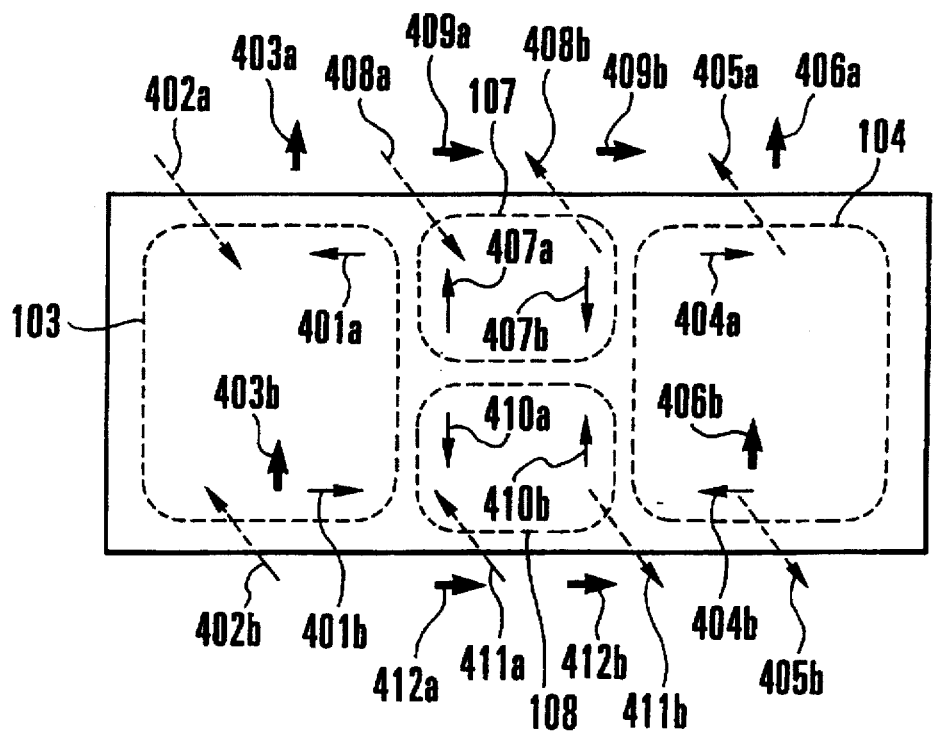
FIG. 10 is a view for explaining the magnetic field, currents, and driving directions of the coil portion of the objective lens actuator shown in FIGS. 7A and 7B.

Referring to FIG. 10, in order to more easily understand an electromagnetic drive operation, the relationship between a magnetic field direction and a current direction is shown with respect to a focusing drive operation and a tracking drive operation. Note that, according to the Fleming's left-hand rule, a driving direction is determined by the winding direction of a coil, a current direction, and a magnetic field direction.

First, the focusing drive operation will be described below.

When a current flows in the upper side of the focusing coil 103 in an arrow direction 401a in FIG. 10, a driving force is generated in an arrow direction 403a, i.e., the upper direction in FIG. 10, because the magnet opposing the upper side has the N pole and a magnetic field of an arrow direction 402a. In addition, when a current flows in the lower side of the focusing coil 103 in an arrow direction 401b, a driving force is generated in an arrow direction 403b which is the same as that of the upper side because the magnet opposing the lower side has the S pole and a magnetic field of an arrow direction 402b which is opposite to the direction on the upper side of the focusing coil 103.

Similarly, when a current flows in the upper side of the focusing coil 104 in an arrow direction 404a in FIG. 10, a driving force is generated in an arrow direction 406a, i.e., the upper direction in FIG. 10, because the magnet opposing the upper side has the S pole and a magnetic field of an arrow direction 405a. In addition, when a current flows in the lower side of the focusing coil 104 in an arrow direction 404b, a driving force is generated in an arrow direction 406b which is the same as that of the upper side because the magnet opposing the lower side has the N pole and a magnetic field of an arrow direction 405b which is opposite to the direction on the upper side of the focusing coil 104. More specifically, when currents flow in the focusing coils 103 and 104 in the above directions, the focusing coils 103 and 104 receive an upward driving force in FIG. 10. As a result, the lens holder 102 receives an upward driving force.

A tracking drive operation will be described below.

When a current flows in the left side of the focusing coil 107 in an arrow direction 407a, a driving force is generated in an arrow direction 409a because the magnet opposing the left side has the N pole and a magnetic field of an arrow direction 408a. Similarly, when a current flows in the right side of the focusing coil 107 in an arrow direction 407b, a driving force is generated in an arrow direction 409b, i.e., the same direction as that of the left side because the magnet opposing the right side has the S pole and a magnetic field of an arrow direction 408b.

When a current flows in the left side of the focusing coil 108 in an arrow direction 410a, a driving force is generated in an arrow direction 412a because the magnet opposing the left side has the S pole and a magnetic field of an arrow direction 411a. Similarly, when a current flows in the right side of the focusing coil 108 in an arrow direction 410b, a driving force is generated in an arrow direction 412b, i.e., the same direction as that of the left side because the magnet opposing the right side has the N pole and a magnetic field of an arrow direction 411b.

The driving forces generated by the currents flowing the focusing coils 103 and 104 and the tracking coils 107 and 108 shown in FIG. 9 and the magnetic fields generated by the magnets 111a to 114a are described above. However, since driving forces generated by currents flowing in the pair of focusing coils 105 and 106 arranged on the side surface of the lens holder 102 and magnetic fields generated by the magnets 111b to 114b are the same as the driving forces generated by the focusing coils 103 and 104, a description thereof will be omitted. However, drive currents must flow in the focusing coils such that the directions of the driving forces generated by the focusing coils 103 and 104 are the same as those of the driving forces generated by the focusing coils 105 and 106. In addition, since driving forces generated by currents flowing in a pair of tracking coils, i.e., the tracking coil 109 arranged on the side surface of the lens holder 102 and the tracking coil (not shown) arranged below the tracking coil 109, and the magnetic fields generated by the magnets 111b to 114b have the same directions as those of the driving forces generated by the tracking coils 107 and 108, a description thereof will be omitted. In this case, the drive currents must flow in the coils such that the directions of the driving forces, for the lens holder 102, generated by the pair of focusing coils arranged on one of both the side surfaces of the lens holder 102 are the same as those of the driving forces generated by the pair of focusing coils arranged on the other of both the side surfaces.

In this manner, the pair of focusing coils and the pair of tracking coils are arranged on a given side surface of the lens holder 102 and the side surface opposing the given side surface, and, as shown in FIG. 19, the four magnets opposing these coils are arranged on the actuator base 115 such that adjacent magnets have opposite polarities. When the directions of currents flowing in these coils are controlled, the position of the lens holder 102 supported by the four wires with respect to the actuator base 115 can be vertically and horizontally driven.

As described above, when the four magnets are arranged on the actuator base 115 as shown in FIG. 9 such that adjacent magnets have opposite polarities, division lines for two-dimensionally dividing the magnets from each other, i.e., a total of two division lines constituted by one division line between a group of the magnets 111a and 112a and a group of magnets 113a and 114 and one division line between a group of the magnets 111a and 113a and a group of 112a and 114a, are formed. More specifically, in FIG. 9, adjacent magnets are arranged to have opposite polarities, the two division lines for two-dimensionally dividing the N-pole magnets from the S-pole magnets are formed, and the two division lines are arranged to form a cross.

Figure 11:
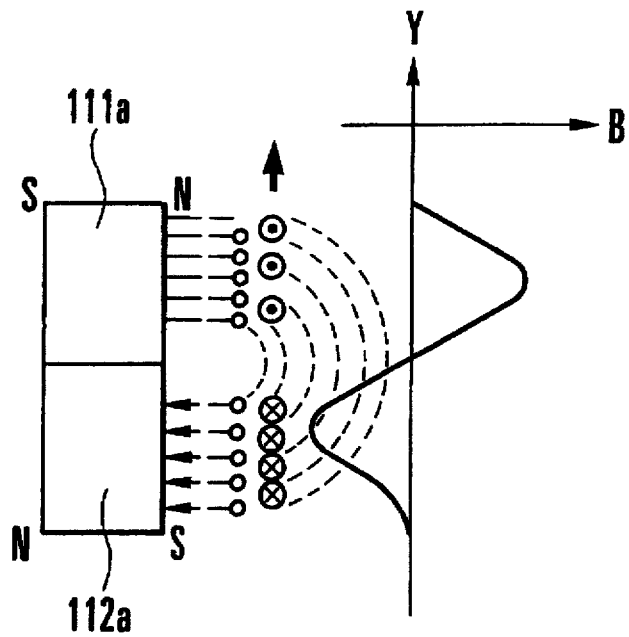
FIG. 11 is a view showing the magnetic flux distribution of the closed magnetic circuit of the objective lens actuator shown in FIGS. 7A and 7B.
Figure 12:
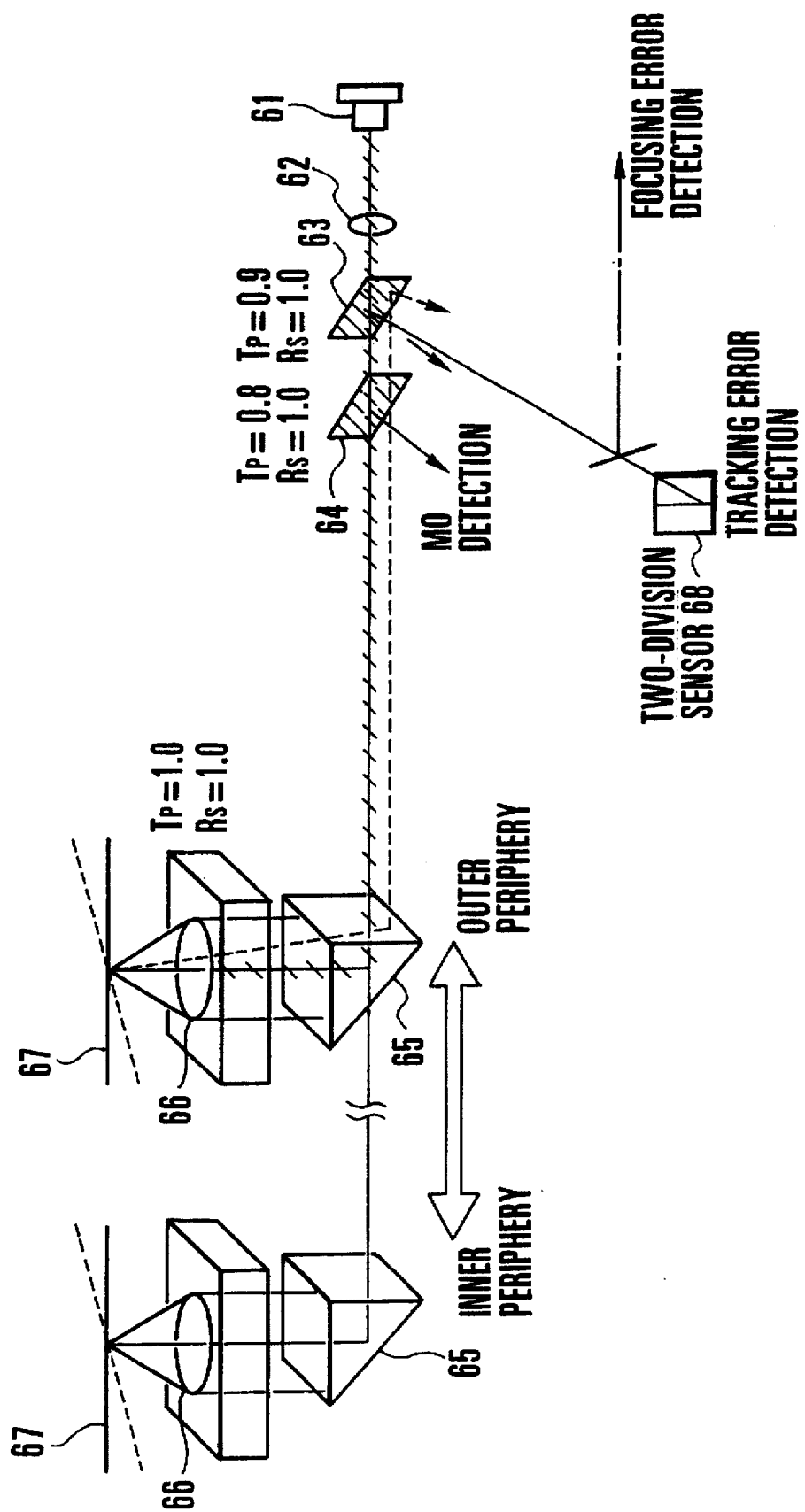
FIG. 12 is a view showing the arrangement of a conventional magneto-optical head.
Figure 13:
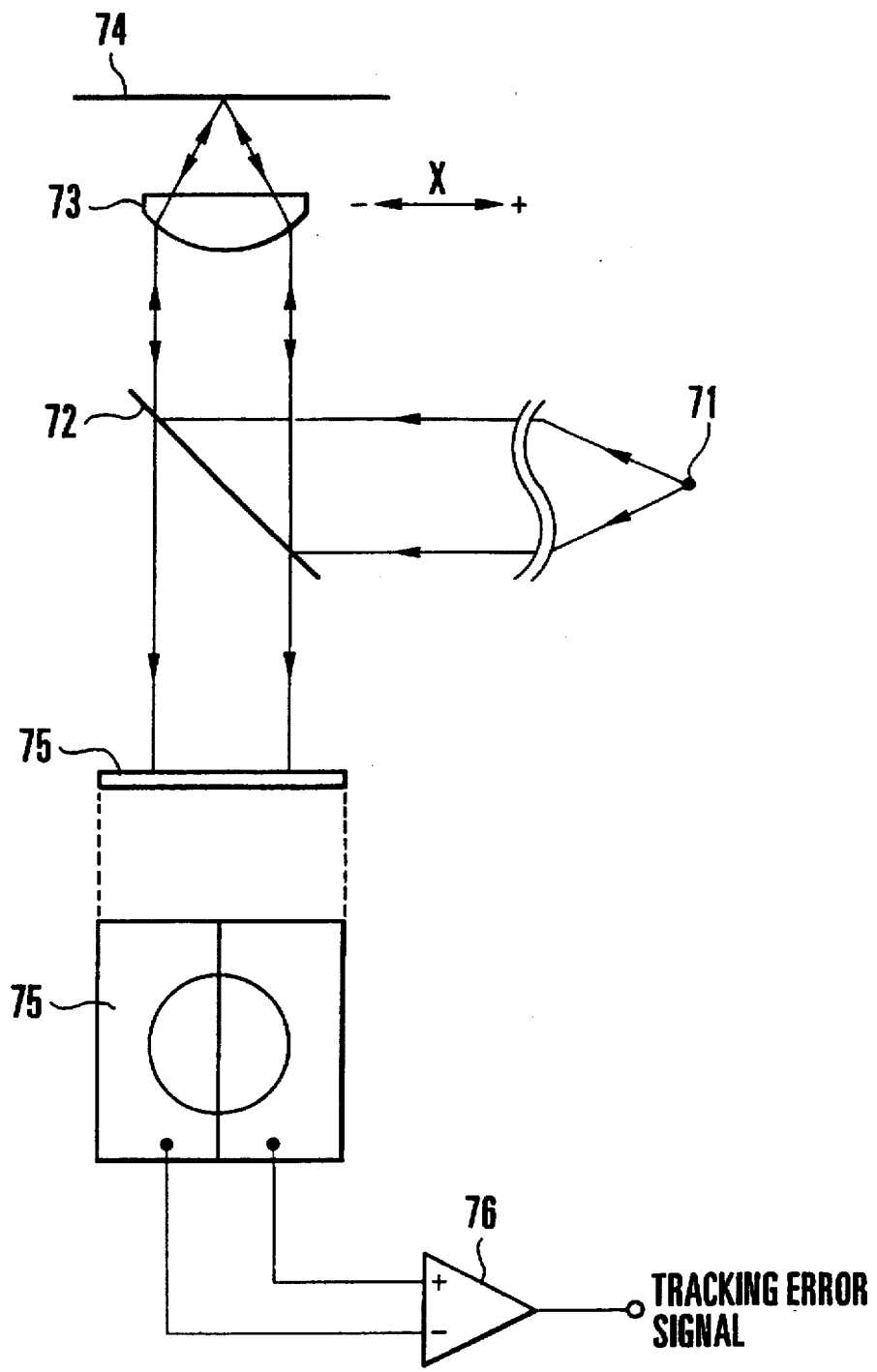
FIG. 13 is a view for explaining an optical system for detecting a tracking error signal of a conventional optical head.
Figure 14A:
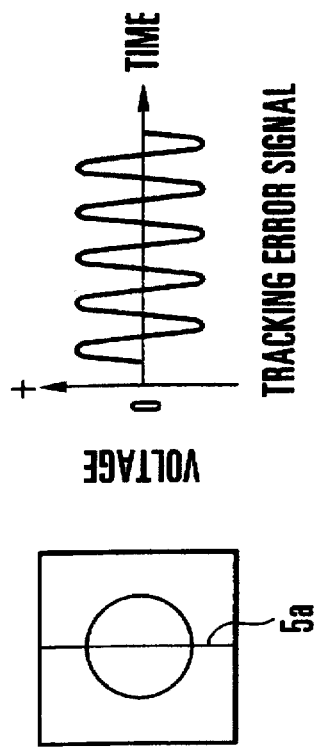
FIGS. 14A to 14C are views for explaining generation of offsets of a tracking error signal.
Figure 14B:
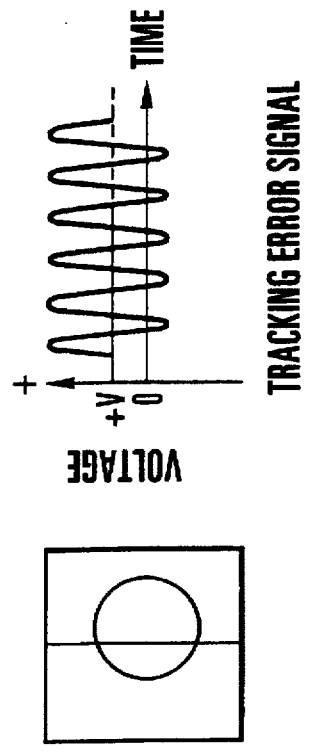
Figure 14C:
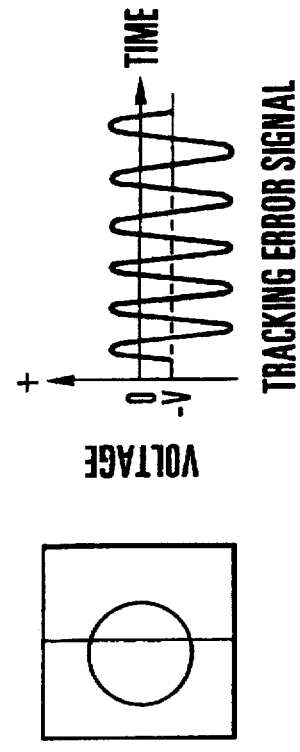

FIG. 11 shows a magnetic flux distribution of the magnets 111a and 112a when viewed from the side surfaces of the magnets 111a and 112a. This magnetic flux distribution is a magnetic field distribution obtained when magnets having opposite polarities are adjacent to each other. FIG. 11 shows a state wherein the focusing coil 103 is arranged in this magnetic field. In the magnetic field distribution shown in FIG. 11, a magnetic flux (B) is plotted along the abscissa, and a distance (Y) is plotted along the ordinate.

As has been described above, since the magnetic circuit has an open magnetic circuit arrangement but has a magnetic circuit arrangement which is two-dimensionally similar to a closed magnetic circuit, a stable electromagnetic drive operation can be realized, and high magnetic utilization efficiency can be obtained as in a closed magnetic circuit constituting a magnetic yoke. In addition, in the magnetic circuit arrangement, the structure of a lens holder can be formed as a square block member, and the coil portion can be directly incorporated in a lens holder serving as a rigid member. For this reason, a high secondary resonance frequency can be advantageously obtained.

As has been described above, in an objective lens actuator for an optical head according to this embodiment, a plurality of magnets are arranged such that adjacent magnets are opposite polarities, e.g., N and S poles, and a square coil is arranged in the lines of magnetic force of the closed magnetic circuit such that the square coil can be driven in the axial directions of the focus-off direction and the tracking direction. The lines of the magnetic force draw arcs because of the N and S poles of the magnets. For this reason, although the magnetic circuit basically has an open magnetic circuit arrangement, the magnetic circuit can be decreased in size without greatly degrading magnetic efficiency as in a closed magnetic arrangement constituting a magnetic yoke, and the structure of a lens holder can be formed as a square block member. Therefore, a coil portion can be directly incorporated in a lens holder serving as a rigid member, and productivity can be improved.

In addition, since the coil portion can be directly incorporated in the lens holder serving as a rigid member, a high secondary resonance frequency can be advantageously obtained.

What is claimed is:

1. An objective lens actuator for an optical head, comprising:

an objective lens on which a beam reflected by an optical disk is incident;

an objective lens holder, having a substantially square frame shape, for holding said objective lens;

a plurality of square flat coils arranged on a pair of opposite side surfaces of said objective lens holder;

a plurality of magnetic circuits arranged to oppose said plurality of flat coils arranged on the pair of side surfaces of said objective lens holder, said plurality of magnetic circuits being arranged such that adjacent magnetic circuits have opposite polarities and at least two division lines for dividing said magnetic circuits from each other on a plane parallel to a side surface of said objective lens, said plurality of flat coils are symmetrically arranged in a vertical and horizontal direction on each said pair of opposite side surfaces of said objective lens holder, and said plurality of magnetic circuits are symmetrically arrayed in a vertical and horizontal direction as they oppose said plurality of flat coils; and a plurality of wire springs for holding said objective lens holder with a degree of freedom in focusing and tracking directions.

2. An actuator according to claim 1, wherein said plurality of wire springs include conductive wire springs disposed on another pair of opposing side surfaces of said objective lens holder, so that a focusing drive current and a tracking drive current are capable of being applied to said flat coils respectively by way of said conductive wire springs.

3. An objective lens actuator for an optical head, comprising:

an objective lens on which a beam reflected by an optical disk is incident;

an objective lens holder, having a substantially square frame shape, for holding said objective lens;

a plurality of square flat coils arranged on a pair of opposite side surfaces of said objective lens holder;

a plurality of magnetic circuits arranged to oppose said plurality of flat coils arranged on the pair of side surfaces of said objective lens holder, said plurality of magnetic circuits being arranged such that adjacent magnetic circuits have opposite polarities and at least two division lines for dividing said magnetic circuits from each other on a plane parallel to a side surface of said objective lens; and a plurality of wire springs for holding said objective lens holder with a degree of freedom in focusing and tracking directions;

said plurality of flat coils including a pair of focusing coils arranged on left and right portions of each of the side surfaces of said objective lens holder and a pair of tracking coils vertically arranged on a central portion of the side surface of said objective lens holder to be interposed between said pair of focusing coils, and said plurality of magnetic circuits including a plurality of magnets arranged such that adjacent magnets have opposite polarities.

4. An objective lens actuator for an optical head, comprising:

an objective lens on which a beam reflected by an optical disk is incident;

an objective lens holder, having a substantially square frame shape, for holding said objective lens;

a plurality of square flat coils arranged on a pair of opposite side surfaces of said objective lens holder;

a plurality of magnetic circuits arranged to oppose said plurality of flat coils arranged on the pair of side surfaces of said objective lens holder, said plurality of magnetic circuits being arranged such that adjacent magnetic circuits have opposite polarities and at least two division lines for dividing said magnetic circuits from each other on a plane parallel to a side surface of said objective lens; and a plurality of wire springs for holding said objective lens holder with a degree of freedom in focusing and tracking directions;

said plurality of magnetic circuits including four magnets having identical shapes and arranged in the form of a lattice such that the division lines form a cross.

5. An actuator according to claim 4, further comprising an elongated actuator base, having a pair of bent portions on which said magnets are fixed, for fixing other ends of side wire springs each having one end fixed on a side surface of said objective lens holder.

* * * * *